United States Patent
Jeon et al.

(10) Patent No.: US 8,761,825 B2
(45) Date of Patent: Jun. 24, 2014

(54) APPARATUS AND METHOD FOR POWER CONTROL OF MOBILE BASE STATION OF VARIABLE BACKBONE CAPACITY

(75) Inventors: Joseph Jeon, Seongnam-si (KR);
Sung-Hyun Choi, Seoul (KR);
Kwang-Hun Han, Icheon-si (KR);
Dong-Myoung Kim, Seoul (KR);
Du-Ho Kang, Seoul (KR); Seung-Hyun Choi, Seoul (KR)

(73) Assignees: Samsung Electronics Co., Ltd., Suwon-Si (KR); SNU R&DB Foundation, Seoul (KR)

( * ) Notice: Subject to any disclaimer, the term of this patent is extended or adjusted under 35 U.S.C. 154(b) by 530 days.

(21) Appl. No.: 13/040,856

(22) Filed: Mar. 4, 2011

(65) Prior Publication Data
US 2011/0218013 A1    Sep. 8, 2011

(30) Foreign Application Priority Data

Mar. 4, 2010  (KR) .................... 10-2010-0019606

(51) Int. Cl.
*H04B 1/00* (2006.01)
*H04B 7/00* (2006.01)

(52) U.S. Cl.
USPC .............. 455/522; 455/69; 455/509; 455/501

(58) Field of Classification Search
USPC .................... 455/509, 452.1, 450, 522
See application file for complete search history.

(56) References Cited

U.S. PATENT DOCUMENTS

| | | | | |
|---|---|---|---|---|
| 6,807,515 | B2 * | 10/2004 | Vogel et al. .................... | 702/188 |
| 7,359,835 | B2 * | 4/2008 | Vogel et al. .................... | 702/188 |
| 7,376,437 | B2 * | 5/2008 | Molkdar et al. .............. | 455/522 |
| 7,542,447 | B2 * | 6/2009 | Ronneke et al. .............. | 370/331 |
| 7,643,841 | B2 * | 1/2010 | Schotten ........................ | 455/522 |
| 7,733,871 | B2 * | 6/2010 | Choi et al. .............. | 370/395.21 |
| 7,835,886 | B2 * | 11/2010 | Vogel et al. .................... | 702/188 |
| 8,018,909 | B2 * | 9/2011 | Ahlen et al. .................. | 370/338 |
| 8,554,474 | B2 * | 10/2013 | Kruithof ........................ | 701/451 |
| 2002/0004379 | A1 * | 1/2002 | Gruhl et al. .................... | 455/403 |
| 2002/0077786 | A1 * | 6/2002 | Vogel et al. .................... | 702/188 |
| 2005/0054300 | A1 * | 3/2005 | Vogel et al. ................ | 455/67.11 |
| 2006/0193289 | A1 * | 8/2006 | Ronneke et al. .............. | 370/329 |
| 2006/0258343 | A1 * | 11/2006 | Schotten ........................ | 455/418 |
| 2008/0151774 | A1 * | 6/2008 | Vogel et al. .................... | 370/252 |
| 2008/0316980 | A1 * | 12/2008 | Ahlen et al. .................. | 370/338 |
| 2009/0181708 | A1 * | 7/2009 | Kim et al. ...................... | 455/501 |
| 2010/0267403 | A1 * | 10/2010 | Lungaro et al. ............... | 455/466 |
| 2011/0202271 | A1 * | 8/2011 | Kruithof ........................ | 701/201 |

* cited by examiner

*Primary Examiner* — Tilahun B Gesesse (57) ABSTRACT

An apparatus and method for power control of a mobile BS of variable backbone capacity. The method includes determining a link state and capacity of a backbone of the BS, and determining a link state and service capacity between the BS and a mobile communication terminal. The method also includes, if the capacity of the backbone is less than the service capacity, setting the backbone capacity similar to the service capacity by lowering a transmit power of the BS by a predefined value.

20 Claims, 6 Drawing Sheets

APPARATUS AND METHOD FOR POWER CONTROL OF MOBILE BASE STATION OF VARIABLE BACKBONE CAPACITY

CROSS-REFERENCE TO RELATED APPLICATION(S) AND CLAIM OF PRIORITY

The present application is related to and claims the benefit under 35 U.S.C. §119(a) of a Korean patent application filed in the Korean Intellectual Property Office on Mar. 4, 2010 and assigned Serial No. 10-2010-0019606, the entire disclosure of which is hereby incorporated by reference.

TECHNICAL FIELD OF THE INVENTION

The present invention relates to an apparatus and method for determining, when backbone capacity is variable, a transmit power between a Base Station (BS) and a mobile communication terminal in consideration of the variable backbone capacity.

BACKGROUND OF THE INVENTION

Conventional mobile communication systems using wired backbones control a transmit power simply by focusing on improvement of link performance between a BS and a mobile communication terminal in determining a downlink transmit power.

This conventional transmit power control technique is to maximize the total capacity of a link between a BS and a mobile communication terminal, or control a transmit power such that an amount of interference exerted on neighboring BSs and mobile communication terminals is reduced.

However, this transmit power control technique assumes that a capacity of a backbone is sufficient and thus a transmission amount required in a wireless link between a BS and a mobile communication terminal is supportable all the time.

Accordingly, when the conventional transmit power control technique, without considering the capacity of the backbone, is applied to a system in which a backbone of a BS is formed by a wireless link of insufficient capacity, and a capacity of the backbone can be insufficient because of circumstances of a movement and the like of the BS, the backbone causes a bottleneck phenomenon.

Accordingly, there is a problem of providing a quality of service noticeably worse than service expected on the basis of a capacity of a link between a BS and a mobile communication terminal. Also, there is a problem that the degree of user satisfaction in communication can be greatly degraded because of the provision of a quality of service much worse than the expected service.

That is, there is a problem that degradation of a quality of service resulting from the deficiency of a capacity of a backbone takes place when many mobile communication terminals have access to a BS of low backbone capacity without considering backbone capacity in a mobile communication system using a wireless backbone.

SUMMARY OF THE INVENTION

To address the above-discussed deficiencies of the prior art, it is a primary aspect of the present invention to substantially solve at least the above problems and/or disadvantages and to provide at least the advantages below. Accordingly, one aspect of the present invention is to provide an apparatus and method for transmit power control in a mobile Base Station (BS) of variable backbone capacity.

Another aspect of the present invention is to provide an apparatus and method for setting a downlink transmit power from a BS to a mobile communication terminal such that a quality of service provided to users can be improved, considering together the performance and capacity of a backbone of the BS as well as the performance of a link between the BS and the mobile communication terminal in determining a downlink transmit power in a mobile BS using a wireless backbone.

The above aspects are achieved by providing an apparatus and method for power control of a mobile BS of variable backbone capacity.

According to one aspect of the present invention, a method for transmit power control in a mobile BS of variable backbone capacity is provided. The method includes determining a link state and capacity of a backbone of the BS. The method also includes determining a link state and service capacity between the BS and a mobile communication terminal. The method further includes, if the capacity of the backbone is less than the service capacity, setting the backbone capacity similar to the service capacity by lowering a transmit power of the BS by a predefined value.

According to another aspect of the present invention, an apparatus of a mobile BS of variable backbone capacity controlling a transmit power is provided. The apparatus includes a receiver and a transmit power manager. The receiver is configured to receive signals from a neighboring BS and a mobile communication terminal. The transmit power manager is configured to determine a link state and capacity of a backbone of the BS through the received signals, determine a link state and service capacity between the BS and a mobile communication terminal and, if the capacity of the backbone is less than the service capacity, set the backbone capacity similar to the service capacity by lowering a transmit power of the BS by a predefined value.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system Henceforth, exemplary embodiments of the present invention provide an apparatus and method for transmit power control in a mobile Base Station (BS) of variable backbone capacity.

A method for determining the number of users supportable on a backbone criterion through a capacity of a wireless backbone is described below.

The capacity of the wireless backbone is determined by a transmission speed provided by a communication technology supporting the wireless backbone. When assuming that the capacity of the wireless backbone is represented as 'C_bb' and an amount demanded by an application program of each user is all a fixed value and is represented as 'd_user', the number (N_bb) of users supportable by the wireless backbone can be determined through an equation N_bb=C_bb/d_user.

If the number of users who are now in access is represented as 'N_now', when the 'N_now' is greater than the 'N_bb', it becomes a state in which, among all the access users, as many users as a 'N_now−N_bb' number do not get a sufficient quality of service due to the deficiency of backbone capacity.

The following description is made for a method for deter lining a capacity of a BS-user link and, through this, determining the number of users supportable on a BS-user link criterion.

The amount demanded by the application program of each user is represented as 'd_user', and a transfer rate of each user (i) per use of a basic resource unit is represented as 'r_i'. The 'r_i' is determined through a transmission technique provided by a system, a reception Signal to Interference Noise Ratio (SINR) of a size of a resource unit and the like. And, the number of resource units necessary for the user (i) to satisfy as many demands as the 'd_user' is determined by 'd_user/r_i'.

When the number of total resources within one frame is represented as 'M_total', the number (N_supported) of users now supported by a capacity of a BS-user link can be determined through the following method.

First, a unit use amount of now resource is set to 'M_now (=0)', and the number of users now supported is set to 'N_supported (=0)' that is an initial value. A set of user indexes sequentially arranged in ascending order for each 'd_user/r_i' is represented as 'S'.

```
For j=1 ~ N_now
    When index of j^th user among 'S' is represented as 'i',
    If M_now + d_user/r_i < M_total
        N_supported = N_supported + 1;
        M_now = M_now + d_user/r_i;
    Else
        Exit for
    End for
```

The above algorithm is a procedure of, for the $j^{th}$ user whose index is 'i', when the sum of a now resource unit use amount (M_now) and the number (d_user/r_i) of resource units necessary for the user (i) to satisfy as many demands as the 'd_user' is less than the number (M_total) of total resources within one frame, increasing, by '1', the number (N_supported) of users now supported, and increasing the now resource unit use amount (M_now) as much as the number (d_user/r_i) of resource units necessary for the user (i) to satisfy as many demands as the 'd_user'.

Determination of a state that a capacity of a backbone causes a performance bottleneck is carried out on the following criteria.

As defined above, the number of now access users is represented as 'N_now', the number of users restricted by a backbone is represented as 'N_bb', and the number of users restricted by a link between a BS and a terminal is represented as 'N_link'. At this time, the following are given.

(1) N_bb <N_now <=N_link (2) N_bb <N_link <=N_now

The above two Cases (1) and (2) are defined to be a state that a capacity of a backbone causes a performance bottleneck.

That is, it is defined that a capacity of a backbone causes a performance bottleneck in Case (1) where the number (N_now) of now access users is greater than the number (N_bb) of users restricted by the backbone and is equal to or less than the number (N_link) of users restricted by the link between the BS and the terminal, or in Case (2) where the number (N_now) of now access users is greater than the number (N_bb) of users restricted by the backbone and is equal to or greater than the number (N_link) of users restricted by the link between the BS and the terminal. In Case (2), the number (N_link) of users restricted by the link between the BS and the terminal is greater than the number (N_bb) of users restricted by the backbone.

An algorithm for preventing an unnecessary number of accesses in an environment in which a capacity of a backbone causes a performance bottleneck and controlling a transmit power so as to reduce unnecessary interference in neighboring cells is constructed as below.

Regarding a specific BS for transmit power control, when the BS is in a state that a capacity of a backbone causes a performance bottleneck, the BS lowers a transmit power by a predefined level (Δp), identifies if it is still in the state that the backbone capacity causes the performance bottleneck and, as long as the bottleneck state is kept, continuously repeats the above operation until the transmit power reaches a set minimum power limit.

When the BS is aware of channel state information between mobile communication terminals and other neighboring BS, the BS is able to predict and just set a minimum transmit power within a limit keeping a state that backbone capacity causes a performance bottleneck without need of several transmit power decreases.

In order to achieve the above objective, a BS wirelessly connected with a backbone using a transmit power control method according to the present invention determines downlink circumstances for a mobile communication terminal to which itself is now servicing, determines a load level of each of users, and determines the channel circumstances of a wireless backbone to predict a capacity of the backbone.

On the basis of the above determined and predicted information, the BS efficiently selects and uses a low transmit power such that a transmit power is not used more than needed, thus preventing many mobile communication terminals from having access to a BS of insufficient backbone capacity or preventing great interference from being exerted on neighboring BSs and mobile communication terminals.

In addition, when the BS has several independent sectors divided based on a directional antenna, the BS determines if it is efficient to first select any sector among several sectors and control a transmit power, and performs transmit power control for each sector in the determined order of the sectors.

The above embodiment of the present invention is described below in detail with reference to the accompanying drawings.

Figure 1:
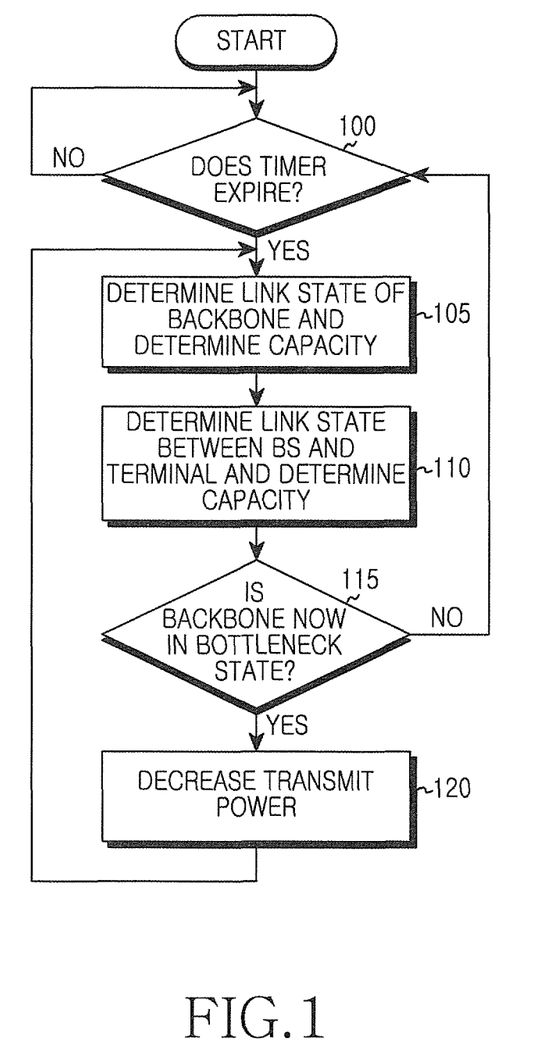
FIG. 1 illustrates a process of selecting a transmit power considering backbone capacity in a Base Station (BS) wirelessly connected with a backbone according to an embodiment of the present invention.

FIG. 1 illustrates a flowchart of a process of selecting a transmit power considering backbone capacity in a BS wirelessly connected with a backbone according to an embodiment of the present invention.

Referring to FIG. 1, if a given timer expires in block 100, the BS proceeds to block 105 and determines a link state of a backbone and determines a capacity of the backbone (C_bb).

Then, in block 110, the BS determines a link state between the BS and a mobile communication terminal, and determines a capacity between the BS and the mobile communication terminal. Here, the capacity between the BS and the mobile communication terminal represents a capacity being currently serviced.

After that, if the backbone is in a bottleneck state in block 115, the BS proceeds to block 120 and decreases a transmit power by a predefined level ($\Delta p$), and repeats the corresponding procedure (blocks 105 and 110) until the backbone does not cause a performance bottleneck.

That is, when a bandwidth (or the number of allowable users) of a backbone is less than a bandwidth (or the number of allowable users) between a BS and a terminal, the BS decreases a transmit power in order to make the bandwidth (or the number of allowable users) of the backbone equal to the bandwidth (or the number of allowable users) between the BS and the terminal.

If the backbone is not in the bottleneck state in block 115, the BS again determines if the timer expires in block 100, and performs the subsequent blocks.

Here, the procedure of a BS determining if the backbone is in the bottleneck state follows the aforementioned procedure of determining a state that a capacity of a backbone causes a performance bottleneck.

Figure 2:
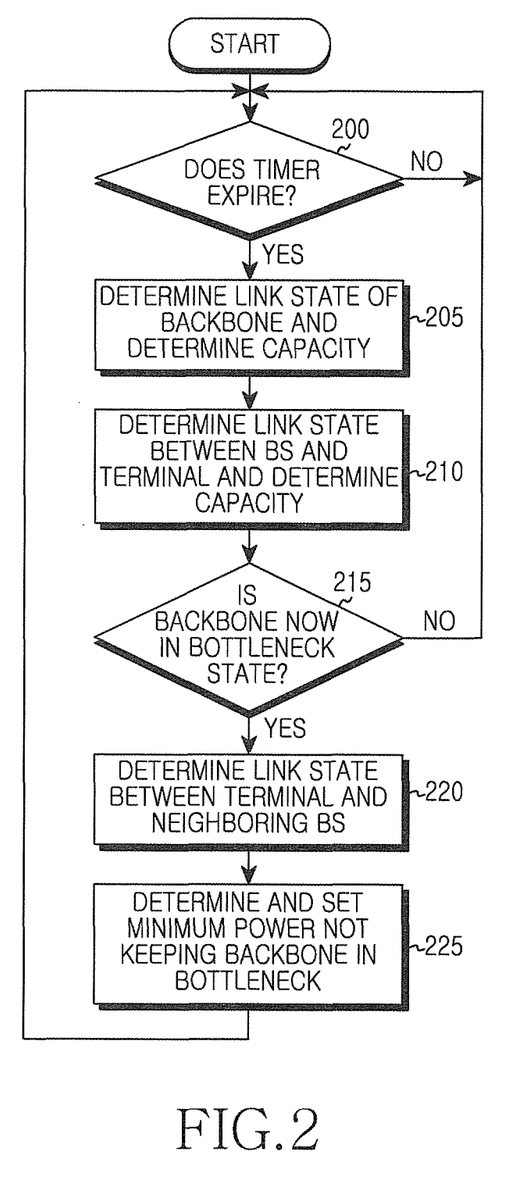
FIG. 2 illustrates a process of selecting a transmit power considering backbone capacity in a BS wirelessly connected with a backbone according to another embodiment of the present invention.

FIG. 2 illustrates a flowchart of a process of selecting a transmit power considering backbone capacity in a BS wirelessly connected with a backbone according to another embodiment of the present invention.

Referring to FIG. 2, the BS substitutes a procedure repeated until a backbone link does not cause a performance bottleneck while continuously decreasing a transmit power by a predefined level, with a procedure of determining a final transmit power at a time.

For the sake of this process, the BS previously collects signal strength information that mobile communication terminals receive from a neighboring BS, and just determines and sets a transmit power for a backbone to finally cause a performance bottleneck.

If a given timer expires in block 200, the BS proceeds to block 205 and determines a link state of a backbone and determines a capacity of the backbone (C_bb). Then, in block 210, the BS determines a link state between the BS and a mobile communication terminal, and determines a capacity between the BS and the mobile communication terminal. Here, the capacity between the BS and the mobile communication terminal represents a capacity being currently serviced.

After that, if the backbone is in a bottleneck state in block 215, the BS proceeds to block 220 and determines link states between a neighboring BS and mobile communication terminals, i.e., the extent of signal strengths that the mobile communication terminals receive from the neighboring BS.

Then, in block 225, the BS determines and sets a minimum power not keeping the backbone in the bottleneck phenomenon.

If the backbone is not in the bottleneck state in block 215, the BS again determines if the timer expires in block 200, and performs the subsequent blocks.

Here, the procedure of a BS determining if the backbone is in the bottleneck state basically follows the aforementioned procedure of determining a state that a capacity of a backbone causes a performance bottleneck.

And, in addition to this procedure, the BS considers and reflects the extent of signal strengths that mobile communication terminals receive from a neighboring BS (for example, sets a transmit power of a high signal strength that a mobile communication terminal receives from a neighboring BS to be less than a previously allocated transmit power at a constant ratio), to determine and set the minimum power keeping the backbone in the bottleneck phenomenon.

In block 225, the BS substitutes a procedure of FIG. 1 repeated until a backbone link does not cause a performance bottleneck while continuously decreasing a transmit power by a predefined level, with a procedure of determining a final transmit power at one time.

Unlike FIG. 1 in which a BS decreases a transmit power by one unit (Op) at a time, in FIG. 2, the BS determines how many units it will decrease, and lowers a transmit power by the determined units all at one time.

Figure 3:
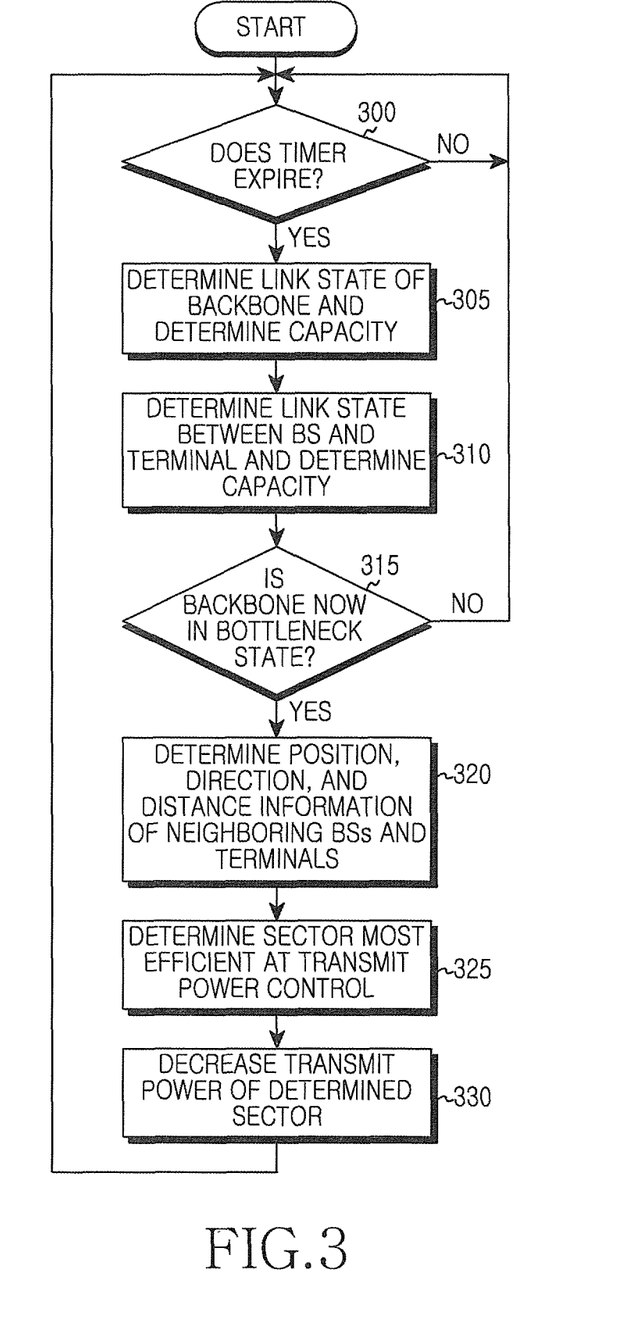
FIG. 3 illustrates a process of selecting a transmit power considering backbone capacity in a BS wirelessly connected with a backbone according to yet another embodiment of the present invention.

FIG. 3 illustrates a flowchart of a process of selecting a transmit power considering backbone capacity in a BS wirelessly connected with a backbone according to yet another embodiment of the present invention.

Referring to FIG. 3, a BS selects a transmit power considering backbone capacity according to an embodiment of FIG. 2. And, when the BS has several independent sectors divided based on a directional antenna, the BS determines if it is efficient to first select any sector among several existing sectors and control a transmit power. After that, the BS performs transmit power control for each sector in the determined order of the sectors.

For the sake of this process, the BS determines direction information, position information, distance information and the like on neighboring BSs and mobile communication terminals and, on the basis of the determined information, the BS selects a sector to control a transmit power. After that, the BS performs an operation of controlling a transmit power in the determined sector.

If a given timer expires in block 300, the BS proceeds to block 305 and determines a link state of a backbone and determines a capacity of the backbone (C_bb). Then, in block 310, the BS determines a link state between the BS and a mobile communication terminal, and determines a capacity between the BS and the mobile communication terminal. Here, the capacity between the BS and the mobile communication terminal represents a capacity being currently serviced.

If the backbone is not in a bottleneck state in block 315, the BS again determines if the timer expires in block 300, and performs the subsequent blocks.

If the backbone is in a bottleneck state in block 315, the BS proceeds to block 320 and determines direction information, position information, distance information and the like on neighboring BSs and mobile communication terminals.

Then, in block 325, the BS searches a sector most efficient at transmit power control. For example, the BS can determine a sector in which there are the most mobile communication terminals, since the sector in which there are the most mobile communication terminals is the sector having the highest transmit power and using the most resources.

The procedure of selecting a sector to control a transmit power on the basis of information between the BS and a mobile communication terminal, and direction information, position information, distance information and the like on neighboring BSs and mobile communication terminals can consider together a condition of, when decreasing a transmit power by an equal level, greatly decreasing an amount of interference exerted on neighboring BSs and mobile communication terminals and a condition of keeping at a small level the sum of attenuation levels of link performance of mobile communication terminals of the determined sector, determining a suitable sector and generating a list of the sectors in order.

As above, the BS selects a transmit power after determining the order of sectors to be power controlled. Thus, the BS is capable of reducing the call failure probabilities of mobile communication terminals compared to performing no power control or performing only power control.

After that, in block 330, the BS decreases a transmit power of the determined sector. Here, a level decreasing the transmit power can follow the process of FIG. 2.

Figure 4:
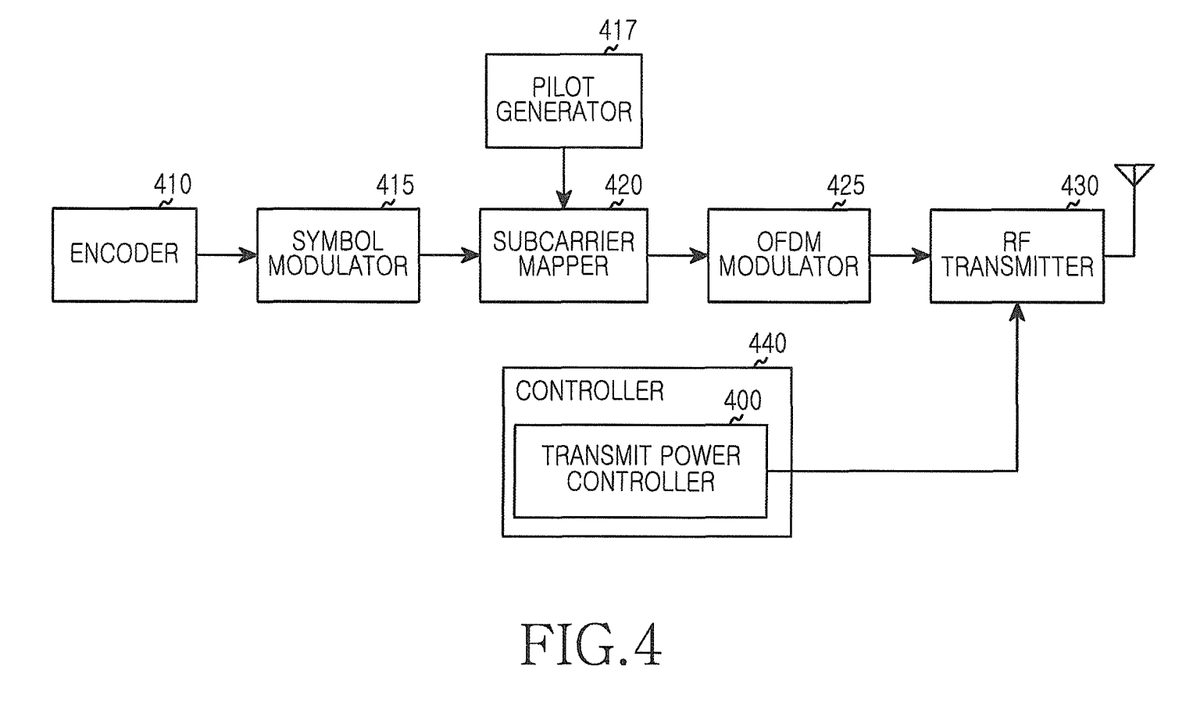
FIG. 4 illustrates a construction of a transmitting unit of a BS using a wireless backbone according to an embodiment of the present invention.

FIG. 4 illustrates a block diagram of a transmitting unit of a BS using a wireless backbone according to an embodiment of the present invention. Here, the transmitting unit is a transmitting unit for a mobile communication terminal.

Referring to FIG. 4, the BS includes an encoder 410, a symbol modulator 415, a pilot generator 417, a subcarrier mapper 420, an Orthogonal Frequency Division Multiplexing (OFDM) modulator 425, a Radio Frequency (RF) transmitter 430, and a controller 440. Here, the controller 440 includes a transmit power controller 400. In an embodiment, the controller 440 controls the remaining function blocks 410 to 430.

The encoder 410 encodes a data bit stream provided from an upper block. The symbol modulator 415 converts the encoded bit stream into complex symbols through modulation.

The pilot generator 417 generates pilot signals and provides the pilot signals to the subcarrier mapper 420. When the pilot signals are scrambled, the pilot generator 417 multiplexes a pilot signal sequence by a scrambling code and then, provides pilot signals multiplied by the scrambling code to the subcarrier mapper 420.

The subcarrier mapper 420 maps a complex symbol and pilot signal to a subcarrier, thereby configuring frequency domain signals.

The OFDM modulator 425 converts frequency domain signals into time domain signals through Inverse Fast Fourier Transform (IFFT) operation and then, inserts a Cyclic Prefix (CP), thereby configuring OFDM symbols of a baseband.

The RF transmitter 430 converts baseband OFDM symbols into a signal of an RF band and then, transmits the RF band signal through an antenna.

The transmit power controller 400 performs operations according to the aforementioned three embodiments. That is, when the BS is in a state that a capacity of a backbone causes a performance bottleneck, the transmit power controller 400 controls the RF transmitter 430 and lowers a transmit power of the BS by a predefined level ($\Delta p$), identifies if it is still in the state that the backbone capacity causes the performance bottleneck, and, as long as the bottleneck state is kept, continuously repeats the above operation until the transmit power reaches a set minimum power limit and the transmit power controller 400 determines a link state of a backbone and determines a capacity of the backbone.

When the BS is aware of channel state information between mobile communication terminals and other neighboring BS, the transmit power controller 400 predicts and just sets a minimum transmit power within a limit keeping a state that a capacity of a backbone causes a performance bottleneck without need of several transmit power decreases. For the sake of this objective, the transmit power controller 400 wirelessly connected with a backbone using a transmit power control method according to the present invention, determines downlink circumstances for a mobile communication terminal to which itself is now servicing, determines a load level of each of users, and determines the channel circumstances of a wireless backbone to predict a capacity of the backbone.

On the basis of the above determined and predicted information, the transmit power controller 400 efficiently selects and uses a low transmit power such that a transmit power is not used more than needed, thus preventing many mobile communication terminals from having access to a BS of insufficient backbone capacity or preventing great interference from being exerted on neighboring BSs and mobile communication terminals.

When the BS has several independent sectors divided based on a directional antenna, the transmit power controller 400 determines if it is efficient to first select any sector among several sectors and control a transmit power, and performs transmit power control for each sector in the determined order of the sectors.

An information acquisition procedure of the transmit power controller 400 and signal reception are described in FIG. 5 below.

In the above block construction, the controller 440 can perform the function of the transmit power controller 400. These are separately constructed and shown in order to distinguish and describe respective functions in the present invention.

Thus, in certain embodiments, a device can be constructed such that the controller 440 can process all of the functions of the transmit power controller 400, or can be constructed such that the controller 440 can process only part of the functions. Also, the remaining function blocks except the controller 440 can be called a 'transmitting unit'.

Figure 5:
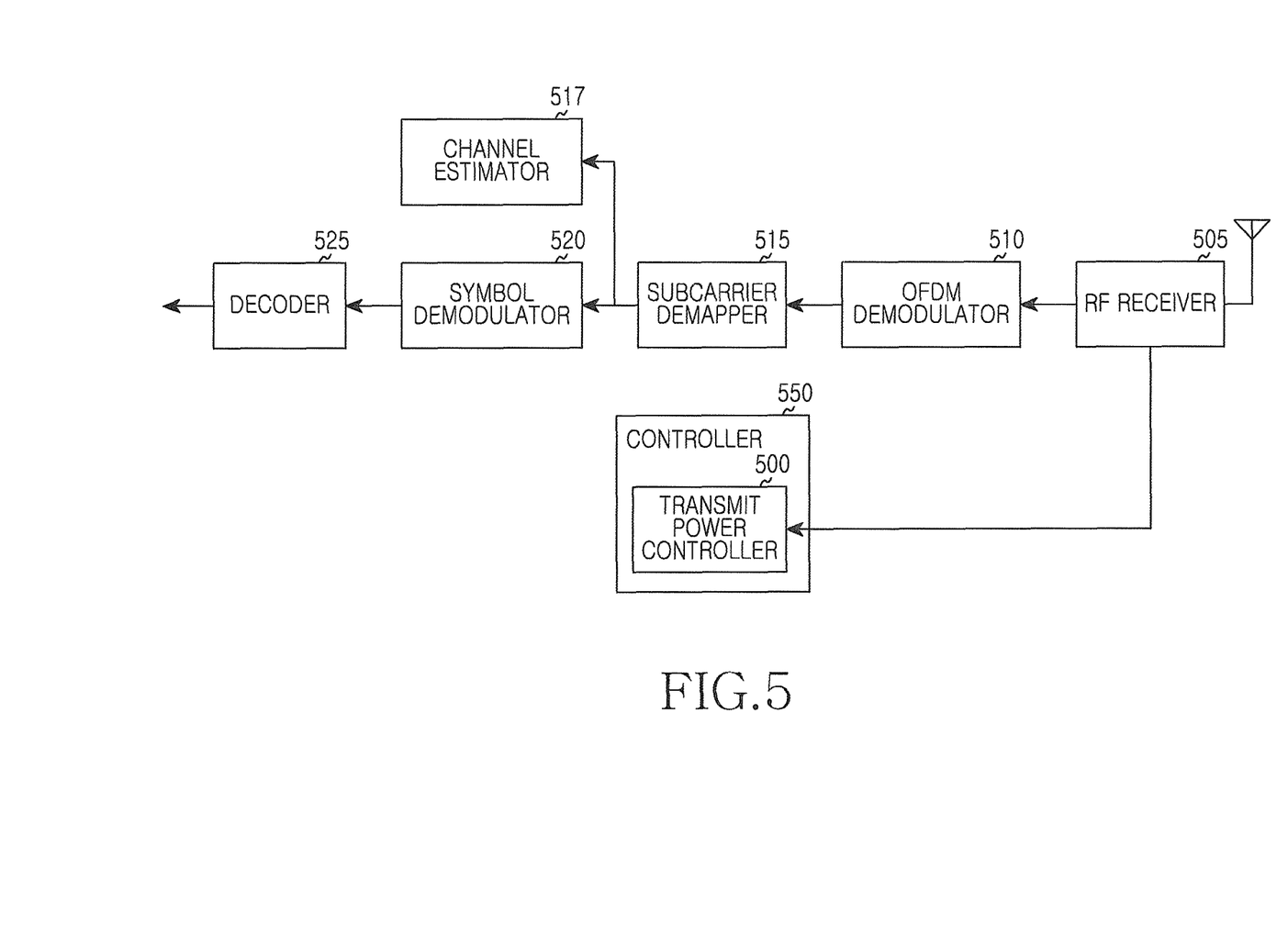
FIG. 5 illustrates a construction of a receiving unit of a BS using a wireless backbone according to an embodiment of the present invention.

FIG. 5 illustrates a block diagram illustrating a receiving unit of a BS using a wireless backbone according to an embodiment of the present invention. Here, the receiving unit is a receiving unit for a mobile communication terminal.

Referring to FIG. 5, the BS includes an RF receiver 505, an OFDM demodulator 510, a subcarrier demapper 515, a channel estimator 517, a symbol demodulator 520, a decoder 525, and a controller 550. The controller 550 includes a transmit power controller 500. In certain embodiments, the controller 550 controls the remaining function blocks 505 to 525.

The RF receiver 505 converts an RF band signal received through an antenna into a baseband signal. The OFDM demodulator 510 distinguishes the baseband signal in a unit of an OFDM symbol, removes a CP, and then restores complex symbols mapped to a frequency domain through Fast Fourier Transform (FFT) operation.

The channel estimator 517 estimates a channel matrix using a pilot signal provided from the subcarrier demapper 515.

The symbol demodulator 520 converts complex symbols into an encoded bit stream through demodulation. The decoder 525 decodes the encoded bit stream, and provides the decoded bit stream to an upper block.

In certain embodiments, the transmit power controller 500 is the same block as the transmit power controller 400 of FIG. 4 and, in addition to the function of FIG. 4, determines a link state between the BS and a mobile communication terminal using the RF receiver 505.

In the above block construction, the controller 550 can perform the function of the transmit power controller 500. These are separately constructed and shown in order to distinguish and describe respective functions in the present invention.

Thus, in certain embodiments, a device can be constructed such that the controller 550 can process all of the functions of the transmit power controller 500, or can be constructed such that the controller 550 can process only part of the functions. Also, the remaining function blocks except the controller 550 can be called a 'receiving unit'.

Figure 6:
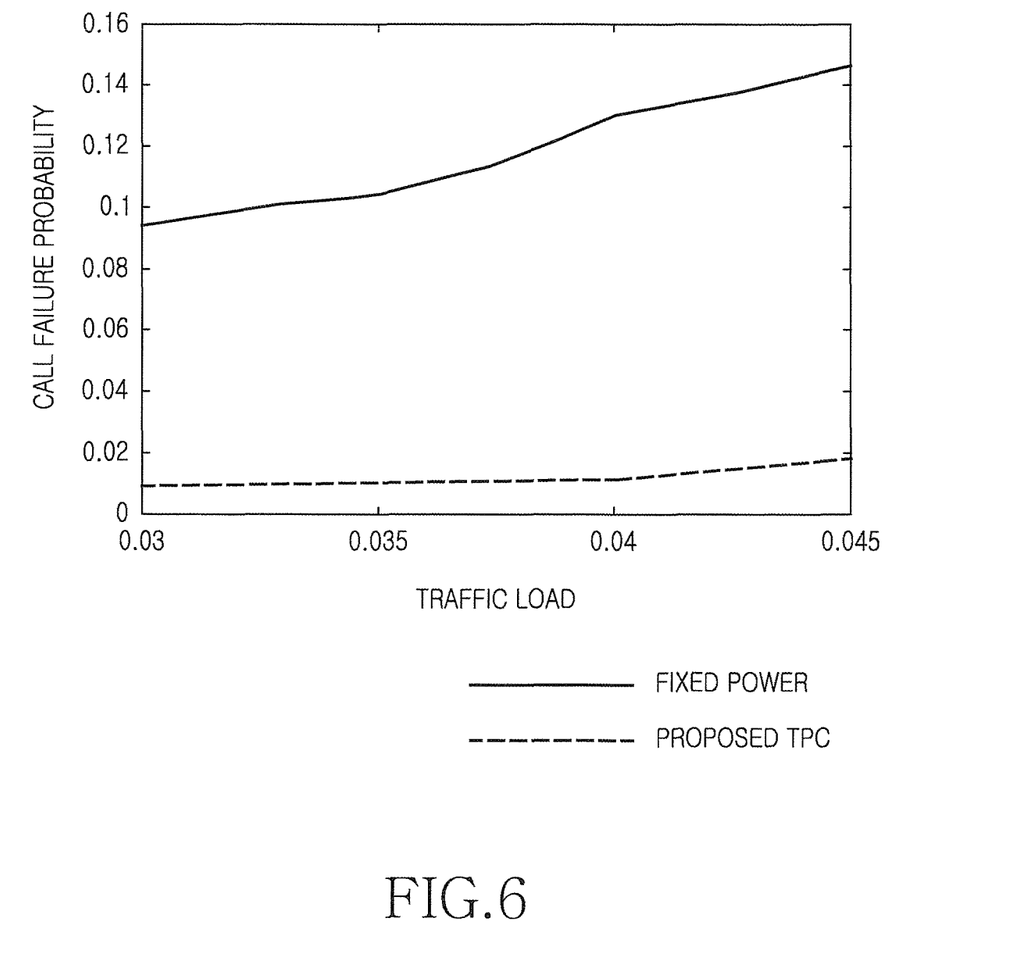
FIG. 6 illustrates a performance result according to an embodiment of the present invention.

FIG. 6 illustrates a graph that shows a performance result according to an embodiment of the present invention.

In FIG. 6, it is defined that the percentage of users subjected to abnormal service is a call failure probability. The graph of FIG. 6 compares and illustrates a call failure probability when a BS determines a transmit power (i.e., performs Transmit Power Control (TPC)) according to the embodiment of FIG. 1 and a call failure probability when a BS simply transmits signals at a maximum transmit power that is a fixed value.

As illustrated in FIG. 6, it can be appreciated that the call failure probabilities of mobile communication terminals decrease when selecting a transmit power according to the present invention, compared to a technique of simply transmitting at a maximum power possible.

In exemplary embodiments of the present invention, a quality of service is improved by controlling a transmit power considering a capacity of a backbone.

Although the present disclosure has been described with an exemplary embodiment, various changes and modifications may be suggested to one skilled in the art. It is intended that the present disclosure encompass such changes and modifications as fall within the scope of the appended claims

What is claimed is:

1. A method for transmit power control in a mobile Base Station (BS) of variable backbone capacity, the method comprising:
    determining, by a transmit power manager, a link state and capacity of a backbone of the BS;
    determining, by the transmit power manager, a link state and service capacity between the BS and a mobile communication terminal; and
    in response to determining that the capacity of the backbone is less than the service capacity, setting, by the transmit power manager, the backbone capacity similar to the service capacity by lowering a transmit power of the BS by a predefined value.

2. The method of claim 1, wherein setting the backbone capacity similar to the service capacity by lowering the transmit power of the BS by the predefined value comprises:
    determining link states between the BS and a mobile communication terminal of the BS and between the BS and a neighboring BS;
    determining the predefined value setting the backbone capacity similar to the service capacity, using the link states between the BS and the mobile communication terminal of the BS and between the BS and the neighboring BS; and
    lowering the transmit power of the BS by the predefined value.

3. The method of claim 2, wherein determining the link states between the BS and the mobile communication terminal of the BS and between the BS and the neighboring BS comprises determining signal strengths between the BS and the mobile communication terminal of the BS and between the BS and the neighboring BS.

4. The method of claim 1, wherein setting the backbone capacity similar to the service capacity by lowering the transmit power of the BS by the predefined value comprises:
    determining information of a mobile communication terminal of the BS and information of a neighboring BS;
    determining a sector most efficient at transmit power control and the predefined value using the information of the mobile communication terminal and the information of the neighboring BS; and
    lowering a transmit power of the determined sector by the predefined value.

5. The method of claim 4, wherein the information of the mobile communication terminal and the information of the neighboring BS are at least one of a position, a direction, a distance, and a signal strength of each of the mobile communication terminal and the neighboring BS.

6. The method of claim 1, further comprising, in response to determining that the capacity of the backbone is less than the service capacity, lowering, by the transmit power manager, the transmit power of the BS by the predefined value.

7. The method of claim 6, wherein lowering the transmit power of the BS by the predefined value comprises:
    determining information of a mobile communication terminal of the BS and information of a neighboring BS;
    determining a sector most efficient at transmit power control using the information of the mobile communication terminal and the information of the neighboring BS; and
    lowering a transmit power of the determined sector by the predefined value.

8. The method of claim 7, wherein the information of the mobile communication terminal and the information of the neighboring BS are at least one of a position, a direction, a distance, and a signal strength of each of the mobile communication terminal and the neighboring BS.

9. An apparatus of a mobile Base Station (BS) of variable backbone capacity for controlling a transmit power, the apparatus comprising:
    a receiver configured to receive signals from a neighboring BS and a mobile communication terminal; and
    a transmit power manager configured to determine a link state and capacity of a backbone of the BS through the received signals, determine a link state and service capacity between the BS and a mobile communication terminal and, in response to determining that the capacity of the backbone is less than the service capacity, set the backbone capacity similar to the service capacity by lowering a transmit power of the BS by a predefined value.

10. The apparatus of claim 9, wherein the transmit power manager is further configured to:
- determine link states between the BS and a mobile communication terminal of the BS and between the BS and a neighboring BS;
- determine the predefined value setting the backbone capacity similar to the service capacity, using the link states between the BS and the mobile communication terminal of the BS and between the BS and the neighboring BS; and
- lower the transmit power of the BS by the predefined value.

11. The apparatus of claim 10, wherein the transmit power manager is configured to determine signal strengths between the BS and the mobile communication terminal of the BS and between the BS and the neighboring BS, thereby determining the link states between the BS and the mobile communication terminal of the BS and between the BS and the neighboring BS.

12. The apparatus of claim 9, wherein the transmit power manager is further configured to:
- determine information of a mobile communication terminal of the BS and information of a neighboring BS;
- determine a sector most efficient at transmit power control and the predefined value using the information of the mobile communication terminal and the information of the neighboring BS; and
- lower a transmit power of the determined sector by the predefined value.

13. The apparatus of claim 12, wherein the information of the mobile communication terminal and the information of the neighboring BS are at least one of a position, a direction, a distance, and a signal strength of each of the mobile communication terminal and the neighboring BS.

14. The apparatus of claim 9, wherein, in response to determining that the capacity is less than the service capacity, the transmit power manager is configured to lower the transmit power of the BS by the predefined value.

15. The apparatus of claim 14, wherein the transmit power manager is further configured to:
- determine information of a mobile communication terminal of the BS and information of a neighboring BS;
- determine a sector most efficient at transmit power control using the information of the mobile communication terminal and the information of the neighboring BS; and
- lower a transmit power of the determined sector by the predefined value.

16. The apparatus of claim 15, wherein the information of the mobile communication terminal and the information of the neighboring BS are at least one of a position, a direction, a distance, and a signal strength of each of the mobile communication terminal and the neighboring BS.

17. A mobile Base Station (BS) having a variable backbone capacity, the BS comprising:
- a transmitter;
- a receiver configured to receive signals from a neighboring BS and a mobile communication terminal; and
- a transmit power manager coupled to the transmitter, the transmit power manager configured to determine a link state and capacity of a backbone of the BS through the received signals, determine a link state and service capacity between the BS and a mobile communication terminal and, in response to determining that the capacity of the backbone is less than the service capacity, set the backbone capacity similar to the service capacity by lowering a transmit power of the BS by a predefined value.

18. The BS of claim 17, wherein the transmit power manager is further configured to:
- determine link states between the BS and a mobile communication terminal of the BS and between the BS and a neighboring BS;
- determine the predefined value setting the backbone capacity similar to the service capacity, using the link states between the BS and the mobile communication terminal of the BS and between the BS and the neighboring BS; and
- lower the transmit power of the BS by the predefined value.

19. The BS of claim 18, wherein the transmit power manager is configured to determine signal strengths between the BS and the mobile communication terminal of the BS and between the BS and the neighboring BS, thereby determining the link states between the BS and the mobile communication terminal of the BS and between the BS and the neighboring BS.

20. The BS of claim 17, wherein the transmit power manager is further configured to:
- determine information of a mobile communication terminal of the BS and information of a neighboring BS;
- determine a sector most efficient at transmit power control and the predefined value using the information of the mobile communication terminal and the information of the neighboring BS; and
- lower a transmit power of the determined sector by the predefined value.

\* \* \* \* \*